Dec. 16, 1969  J. H. GEIGER  3,484,108
MAP GAME APPARATUS
Filed Oct. 19, 1966  4 Sheets-Sheet 1

INVENTOR
JOHN H. GEIGER
BY
ATTORNEY

Dec. 16, 1969 J. H. GEIGER 3,484,108
MAP GAME APPARATUS
Filed Oct. 19, 1966 4 Sheets-Sheet 2

INVENTOR
JOHN H. GEIGER
BY
ATTORNEY

Dec. 16, 1969  J. H. GEIGER  3,484,108
MAP GAME APPARATUS
Filed Oct. 19, 1966  4 Sheets-Sheet 3

INVENTOR
JOHN H. GEIGER
BY
ATTORNEY

Dec. 16, 1969  J. H. GEIGER  3,484,108
MAP GAME APPARATUS
Filed Oct. 19, 1966  4 Sheets-Sheet 4

INVENTOR.
JOHN H. GEIGER
BY
ATTORNEY

United States Patent Office 3,484,108
Patented Dec. 16, 1969

3,484,108
MAP GAME APPARATUS
John H. Geiger, 57 N. Maple Ave.,
Basking Ridge, N.J. 07920
Filed Oct. 19, 1966, Ser. No. 587,761
Int. Cl. A63f 3/04
U.S. Cl. 273—135                                    9 Claims

ABSTRACT OF THE DISCLOSURE

A game involving city and regional planning including a map of a territory which may be divided into areas of particular land use, a screen positioned over the map with a multitude of uniform openings, a multitude of playing pieces which may be of different colors to indicate particular land uses, and an input generator containing four pairs of dice, each of the pairs of dice being located in a separate compartment, which when shaken determines the position of the playing pieces on the screen by means of a coordinate number system, the color of the playing pieces to be used, and the amount of such playing pieces. The playing screen may have square openings, the playing pieces being spherical, or hexagonal openings, the playing pieces being cubical. A scoring screen with counter pieces may be utilized by each player. An alternative form of input generator comprises two balls in separate compartments of a housing, each ball selecting a number from 1 to 9.

---

This invention pertains to games and more particularly to educational games.

One object of this invention is to provide an educational game which is interesting in itself regardless of the educational values and which appeals not only to adults but also strongly appeals to teenagers or students in prep schools and colleges.

Another object is to introduce the essential factors of city and regional planning without detracting from the interest and pleasure in playing the game.

Other objects and advantages will be apparent from the following specification and from the appended drawings.

Figure 5:
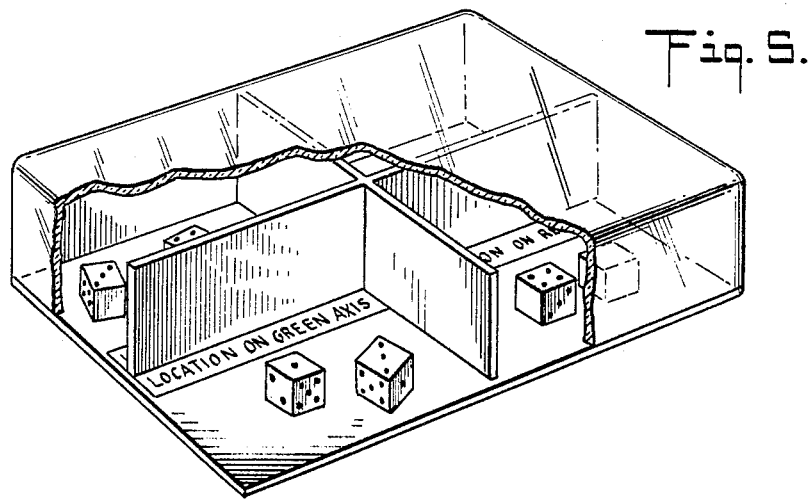

FIG. 5 is a perspective view with the cover partially broken away to clearly show the interior of an input generator which has the form of a box with transparent cover, within which playing dice are located in pairs. As shown, the input generator has four compartments with one pair of dice in each and is ready for use when either two, three or four players are engaged in playing the game. Preferably each player has an input generator for his own use.

Figure 6:
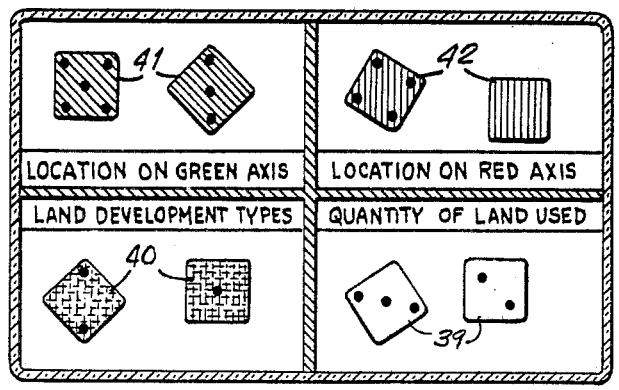

FIG. 6 is a plan view of the four pairs of dice used in the device of FIG. 5. Each pair of dice is a distinct color, as indicated by cross hatching in accordance with the Patent Office requirements.

Figure 7:

FIG. 7 is an elevation of nine spherical playing pieces.

It is usual to supply a large number of each; for example, at least 200 of each of the nine different colors of spherical pieces are provided and may be stored in a compartmentalized tray or box, not shown.

Figure 8:
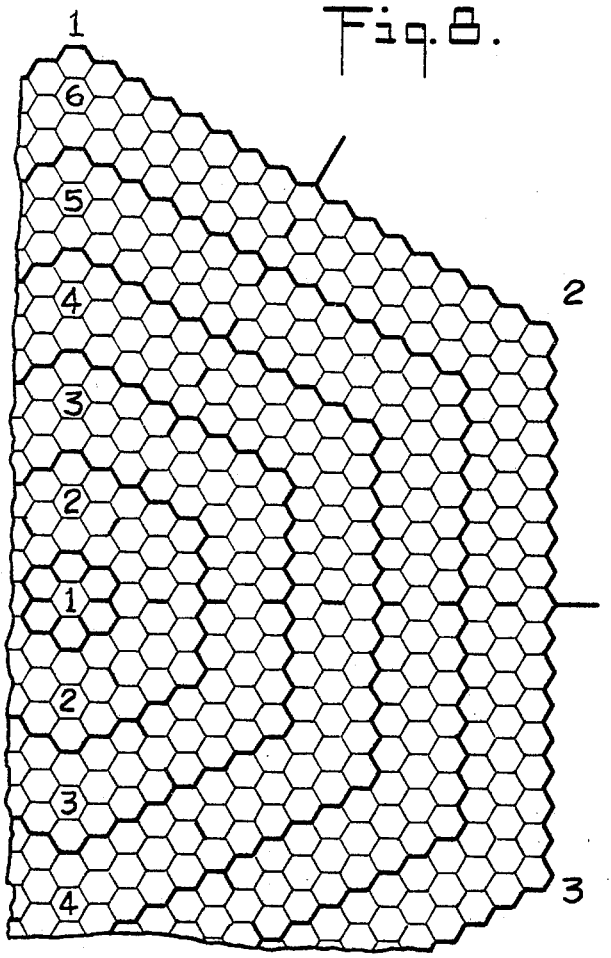

FIG. 8 is a partial plan view of an alternative form of playing screen in which the entire screen is made up of hexagonal instead of square openings.

Figure 9:
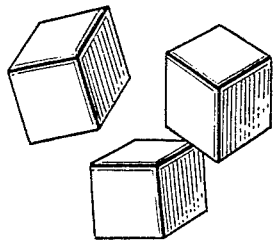

FIG. 9 shows three cubes in perspective.

Figure 10:
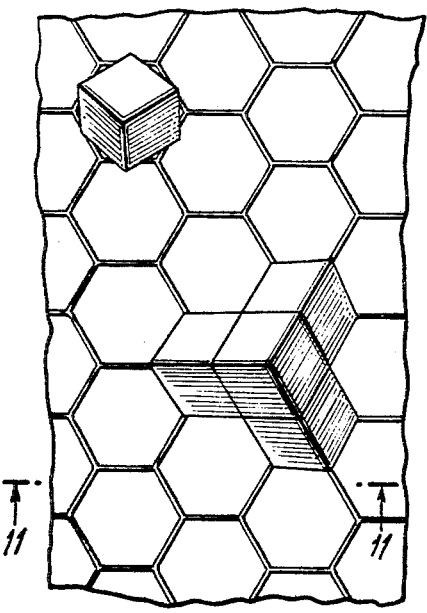

FIG. 10 is a fragment of FIG. 8 on a larger scale showing the use of cubical playing pieces instead of spheres.

Figure 11:
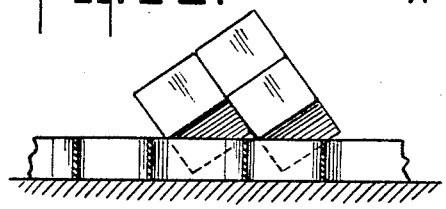

FIG. 11 is a partially sectional elevation on the line 11—11 of FIG. 10.

Figure 12:
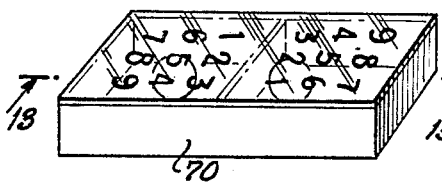

FIG. 12 is a perspective view of an alternative form of input generator.

Figure 13:
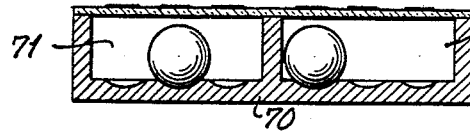

FIG. 13 is a sectional elevation of the alternative form of input generator on the line 13—13 of FIG. 12. Numbers from 1 to 9 are displayed on the top of each half of the input generator.

While the essential parts required for playing the game are shown, it is possible to play several different games which have the same principle involved, and the game which I now prefer as most interesting and instructive is called "Metroplan" and is described more in detail in reference to the drawings as follows:

Metroplan has been carefully designed to provide a vehicle for expressing the artistic and scientific talents of the players, particularly as these relate to spatial and structural phenomena. During the course of play, a full color three-dimensional model of metropolitan development evolves. While building the model, the players draw instinctively upon their esthetic sense of balance, proportion, and unity in combining color, line, texture and mass to create a pleasing and functional pattern of metropolitan structure. In keeping account of growth and development by means of a unique scoring system, the participants develop skill in the use of number concepts, acquire a knowledge of the theory of probability and gain a better understanding of some of the fundamental techniques employed in electronic data processing.

Figure 1:
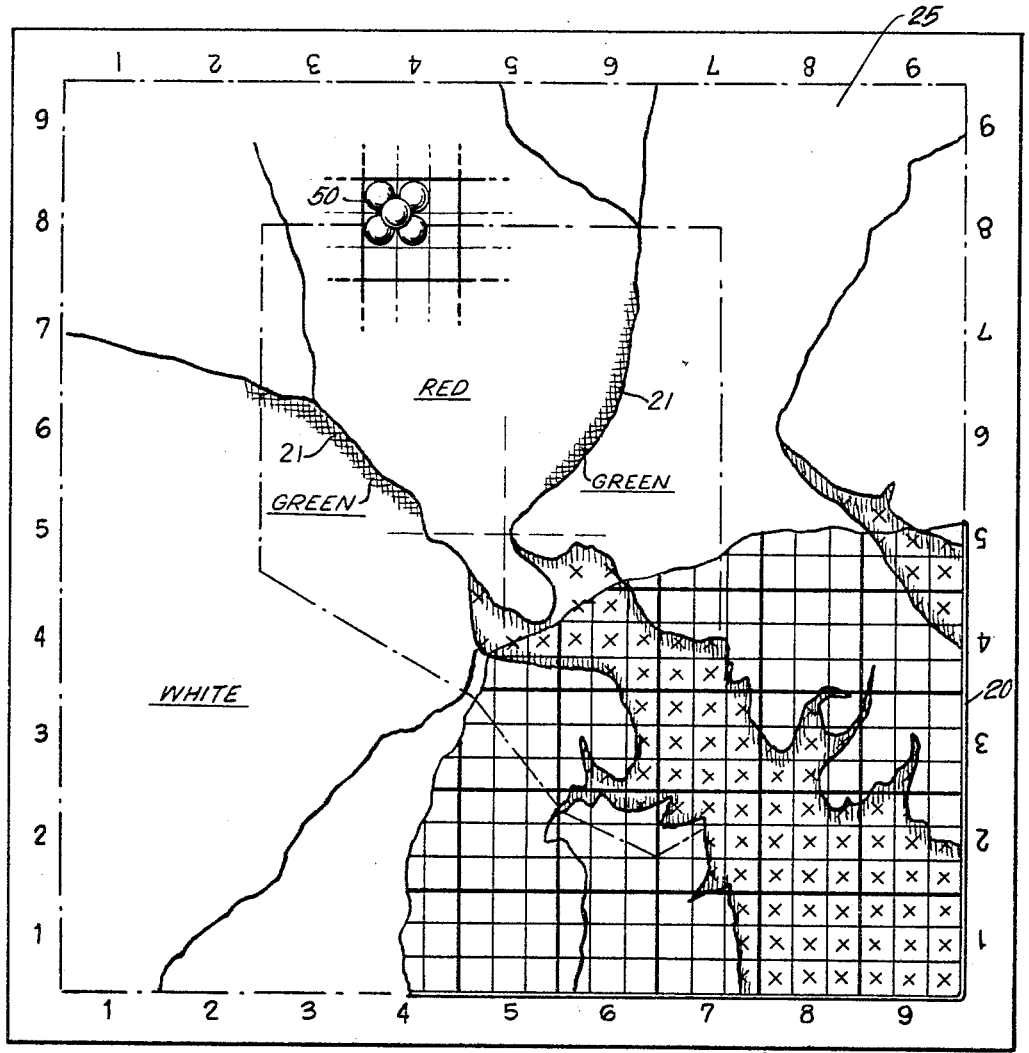
FIG. 1 is a plan view of the game apparatus with the playing screen partially broken away to show more clearly the planning map on which the screen is mounted.
Figure 4:
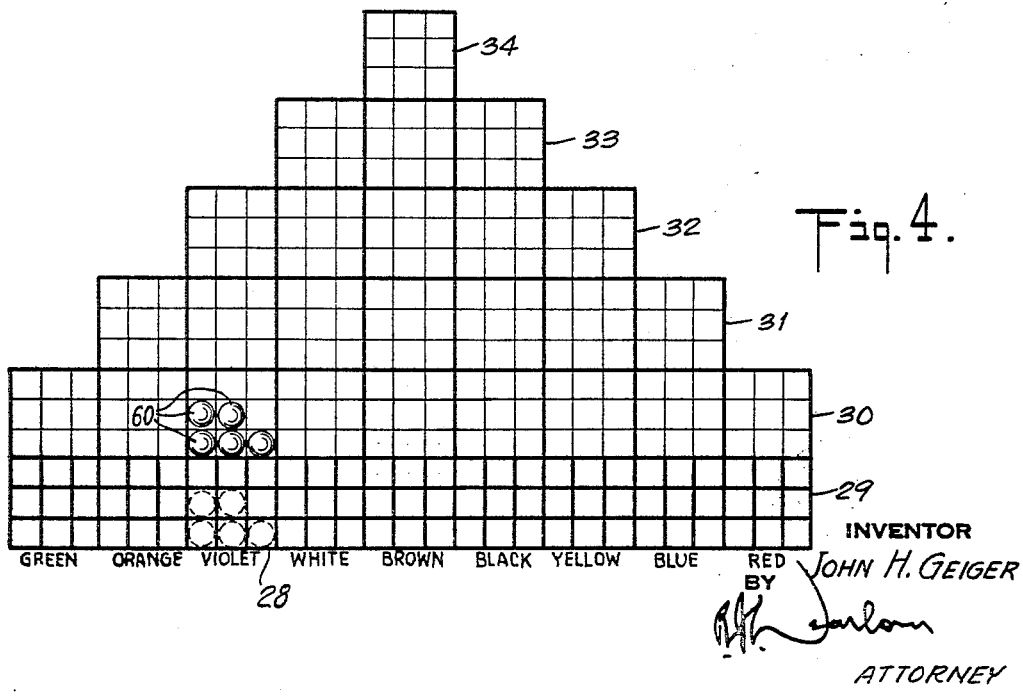
FIG. 4 is a plan view of the scoring screen, one of which is used by each player, usually 2, 3 or 4 being engaged in play at one time.

A playing screen 20 adapted to hold spherical playing pieces (as described below) is mounted over a map which is hereinafter referred to as a "Development Plan" and which is shown in FIG. 1 under the screen and is designated 25. Each player, and for convenience we will assume in each case that there are four players, is provided with a scoring screen 28, as shown in FIG. 4. The scoring screen has a section 29 which has storage spaces for 81 playing pieces, which storage spaces are outlined by heavy black boundaries. The spherical scoring pieces, which are preferably of the same colors as the land development type (as explained below) for which they tabulate the score, are first mounted in the spaces of the storage positions as described below.

Figure 2:
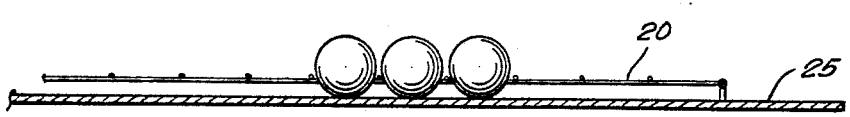
FIG. 2 is a partial cross section of the apparatus of FIG. 1 on a larger scale to show the location of the screen spaced above the base and with several spherical playing pieces mounted on the base and held in place by the screen.
Figure 3:
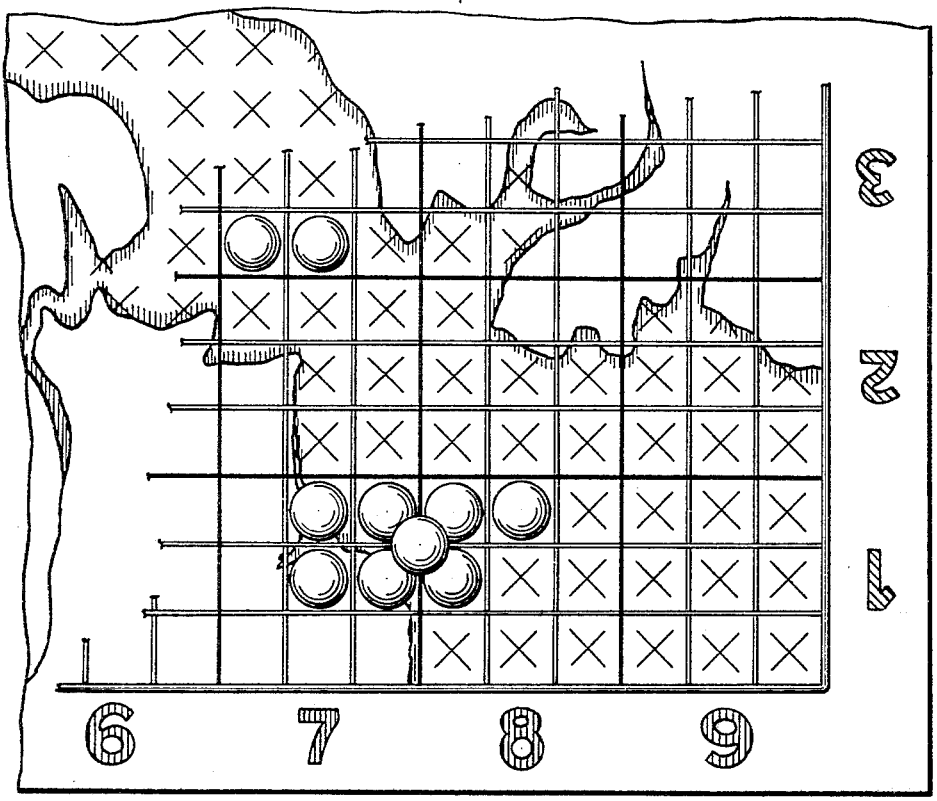
FIG. 3 is a plan view of a small portion of the apparatus on a much larger scale and shows a plurality of spherical playing pieces in close proximity with one of the spherical pieces mounted on top of four pieces on the screen below.

Adjacent to this section 29 of the scoring screen 28 is a screen section 30 of equal length and three spaces in width, having 81 spaces; then an adjacent screen section 31 of shorter length and three spaces in width which provides 63 spaces for scoring pieces. Adjacent to this is a still shorter section 32 having 45 spaces for scoring pieces, and adjacent to that is a shorter section 33 having 27 spaces and finally there is a square section 34 having nine spaces. Each of the scoring screens is preferably mounted as the main screen 20 is mounted in FIG. 2, so that spherical counter pieces may be supported and held in place in any of the spaces of the scoring screen. The method of scoring using the scoring screen 28 is described below.

The dice used in playing Metroplan are modified from standard dice and are called "decimal dice." Each die has one to five spots on each of five faces and a blank space (no spots) on the sixth face. The numbers of spots on the faces of the die are so arranged that the spots on any two opposite faces always add up to five. The arrangement of spots will appear as follows:

| Face of Die | Number of spots | Sum of spots on opposit Faces |
|---|---|---|
| Top | Blank | 5 |
| Bottom | 5 | |
| Front | 1 | 5 |
| Rear | 4 | |
| Right | 2 | 5 |
| Left | 3 | |

The decimal dice are preferably molded plastic cubes with bodies of one of ten colors: red, yellow, blue, green, orange, violet, black, gray, white, or brown and spots of a suitable contrasting color.

In application, decimal dice adapt themselves readily to use in multiple pairs, either sequentially or simultaneously. They also permit the use of the decimal system of notation, since the sum of the exposed spots on a pair of decimal dice will always be a whole number between zero and ten.

For use in playing the game of Metroplan, 2500 colored spheres are mounted in compartments formed by partitioning a shallow box (not shown) so that one compartment is formed for each color required in playing the game. The first two pairs of dice 41 and 42 (colored green and red, respectively) in the input generator (see FIG. 6) will indicate where the playing pieces (colored spheres) are to be placed upon the playing screen. The third pair of dice 39 (white) will indicate the number of playing pieces to be used during each turn and the fourth pair of dice 40 (yellow) will indicate the color of sphere to be played and hence the type of land use. These are determined by the columns of the following code designated "number designation," "use designation," and "color of playing piece." In addition the number of spheres of each color required is shown in the column labeled "number required to play Metroplan."

COLOR AND LAND USE CODE FOR SPHERICAL PLAYING PIECES

| Number Designation | Land Use Designation | Color of Playing Piece | Number Required to Play Metroplan |
|---|---|---|---|
| 0 | Free Choice | | |
| 1 | Parks and Recreation | Green | 100 |
| 2 | Multi-Family Housing | Orange | 200 |
| 3 | Community Facilities | Violet | 300 |
| 4 | Vacant Land | White | 400 |
| 5 | Agricultural Land | Brown | 500 |
| 6 | Surface Transportation | Black | 400 |
| 7 | Single-Family Housing | Yellow | 300 |
| 8 | Industrial and Waterfront | Blue | 200 |
| 9 | Business and Commerce | Red | 100 |
| 10 | Free Choice | | |
| | | | 2,500 |

The Development Plan 25 has green numbers reading 1 to 9 from bottom to top and relatively inverted on the two opposite sides of the plan parallel to the vertical edges of the playing screen. There also are two rows of red numbers which are displayed in relatively inverted arrangement on the top and bottom of the Development Plan reading 1 to 9 from left to right. The two sets of numbers (green and red) constitute the vertical and horizontal coordinates used to locate the playing position for placement of the playing pieces on the playing screen as hereinafter explained. A number of maps or development plans will ordinarily be supplied with the game. Some of these plans will apply to existing cities and may have various colored spots to indicate the location of existing units such as schools, hospitals, parks and the like, as for example in FIG. 1 numerals 21 indicate a park (green areas) and other areas are marked, e.g., "white" and "red," to indicate vacant land and business areas, respectively. In addition, there may be black lines (not shown on the drawings) representing surface transportation routes serving the particular metropolitan region covered by the Development Plan.

The procedure used in playing the game of Metroplan will now be described in detail.

The first player shakes the input generator which contains four pairs of decimal dice, one pair of green dice, one pair of red dice, one pair of white dice and one pair of yellow dice. The total numbers of spots displayed on the pairs of dice respectively indicate the location along the vertical axis of the playing screen (green), the location along the horizontal axis (red), the number of spherical playing pieces to be selected for play and the color of the playing pieces to be selected according to the schedule presented above. In placing the balls (playing pieces) on the playing screen the player generally earns one point for each ball; however, the player may earn more than one point per ball by earning a bonus due to the manner in which he places the balls on the screen. Conversely he may lose points due to a penalty or because according to the rules of the game he cannot conform to the Development Plan by placing all of the balls on the screen. This may occur as the screen is filled with the spherical playing pieces.

Referring to FIG. 1, the player is assumed to have shaken the input generator illustrated in FIG. 5. The dice are then observed and the spots counted. As shown in FIG. 6. There are 3 spots on one of the white dice 39 and two spots on the other, so that the player selects five spherical balls to use on his first move. On the yellow dice 40 there are 2 spots on one and 1 spot on the other, and consequently the land use is determined to be 3 Community Facilites. These are located on the Development Plan shown in FIG. 1 by referring to the green dice 41, which aggregate 8 spots, and the red dice 42, which aggregate 4 spots. The player is thus instructed to play his five violet colored spheres in the grid square designated by 4 on the red axis (horizontal) and 8 on the green axis (vertical). This square appears on the plan to be in an area which is colored white as indicating vacant land use. Consequently, the player places his five violet spheres, which might indicate a school or other Community Facility, within the location 50, thus indicating a Community Facility at that place.

The first player then notes on his counter screen, as indicated in FIG. 4, that he has five points which he registers by moving five violet balls 60 from the storage position in the section 29 to the counting position in section 30.

The second player then proceeds in like manner, shaking the input generator, recording his readings on the dice, selecting his playing pieces and passing the input generator on to the next player as he proceeds to make his play and register his score. Each player should always record the values shown on the input generator dice as a four-digit number in the following order: green, red, white, yellow. The first two digits will always describe the location of the grid square where the play is is to be made and the last two digits will always describe the pieces used to make the play (number and color respectively).

The basic rule for scoring is that each ball properly positioned on the playing screen nets the player a score of one point if the color of the land use is the same as that of the piece so positioned on the plan. Since not all the colors may be represented on all Development Plans, it may be necessary to establish rules of placement which will control the positioning of balls on non-identical colors on the plan.

RULE PERTAINING TO THE PLACEMENT OF SURFACE TRANSPORTATION

Black balls may be placed anywhere on the screen. They should be placed in single line patterns with at least one ball within the base grid square determined by the red and green pairs of dice. A bonus of 3 points will be given for each junction with an existing element of the surface transportation system. No bonus will be given for placing black balls on higher levels, although where necessary they may be so positioned.

RULE PERTAINING TO THE PLACEMENT VACANT AND AGRICULTURAL LANDS

White and brown balls may be placed anywhere on the screen except on a position marked with a black X, which indicates water. They must be placed on the first level, however. Where other balls are already in position, these must be removed before positioning the white or brown balls on the screen. No more balls may be removed than the number of white or brown balls to be played and all balls removed must be of a single color and positioned so that the brown or white balls replacing them will be in a compact and contiguous mass. A bonus of one point for each ball removed will be given and where higher levels are removed the bonus shall be increased in keeping with the Bonus Rule for Higher Levels (below).

RULE PERTAINING TO THE PLACEMENT OF PLAYING PIECES OF THE SECONDARY COLORS (GREEN, ORANGE AND VIOLET)

These balls may be placed on areas of any of the primary colors (yellow, blue or red) or of the same secondary color without restriction. They may not be placed on black X's. Bonuses are given for higher level positions in keeping with the Bonus Rule for Higher Levels (below).

RULE PERTAINING TO THE PLACEMENT OF PLAYING PIECES OF THE PRIMARY COLORS YELLOW, BLUE AND RED)

These balls must be placed on areas of the same color except where otherwise permitted in accordance with the following rules. First level rule: A ball of one of the primary colors may be placed over a position not of the same color if three of the four adjacent positions with a common side are of the same primary color as the ball or of a secondary color composed of colors one of which is the same as the color of the ball in play. Upper level rule: Each ball placed on an upper level must rest upon four balls of the next lower level. On all upper levels, a ball of one of the primary colors must rest upon four balls at least three of which are of the same primary color or of a secondary color composed of colors one of which is the same as the color of the ball in play.

BONUS RULE FOR HIGHER LEVELS

When balls are placed on or removed from higher levels, the score is determined as follows: Number of level $x$ number of balls=Score. For example, if 5 balls are being played after the first level is filled and they can be placed with 4 balls on the second level and one ball on the third level, the score would be as follows:

2 (second level) ×4 (No. of balls played on second level) plus 3 (third level×1 (No. of balls played on third level)=11 points This represents a bonus of six points, since only five balls were played and a score of 11 points was recorded.

RULE FOR MOVEMENT OF PIECES OUT OF THE BASE GRID SQUARE

Occasionally it will be found that no play is possible on the base grid square. When this happens the player may seek to position his pieces in one of the eight grid squares adjacent to the base square. In these instances there is a penalty levied against the player for going outside the base grid square, and the player can receive only a fraction of the normal score. If the player moves his pieces to squares closer to the Central Business District, hereinafter designated C.B.D., (Grid Square 5,3), he may record no more than two-thirds of the score actually tallied; if he moves his pieces to squares farther away he may record no more than one-third, and if he is the same distance from the C.B.D., he may record no more than one-half of the score actually tallied in the new position. For example, let us assume that the decimal dice called for a play of 7, 4, 5, 7, meaning that the base grid square was row 7, column 4 and that we were to play 5 yellow balls. Let us further assume that no play could be made in the base grid square. We found by examination that we could play 4 on the first level and 1 on the second level in grid square 6, 4. This is closer to the C.B.D. than 7, 4, and therefore we can record no more than two-thirds of the score actually tallied, which is 6 points. We therefore record 4 points with the yellow balls on the scoring screen by moving each of 4 yellow balls ahead one position on the scoring screen.

It should be noted that each digit of the play called for by the decimal dice is a whole number between zero and ten. On the locational grid of the playing screen the numbers run from one to nine. When we throw either a zero or a ten on the column or row locational digit we have a free choice as to where along the row or column (or both) we may want to establish our base grid square. Similarly, when the wite dice show a zero, we lose our turn, and when the yellow dice show a zero or a ten, we may select any color of the nine ball colors to make our play.

As play progresses, we gradually see a three-dimensional model of land development growing before us on the playing screen. The model represents an actual simulation of metropolitan growth (land development as depicted by the various colored balls). We witness the processes of growth and change, renewal and redevelopment, invasion and conservation occurring throughout the metropolitan region. Our input generator performs in keeping with regional social, economic and locational influences. Yet the actual placement of the increments of land development is guided right down to their final location by the development plan, by local economic and social conditions and by the principles of planning and zoning. In addition, the model is extremely sensitive to the physical features influencing land development.

One game of Metroplan can be played with the playing screen for any period. Note that there are three columns in each color register of the scoring screen upon which the scoring pieces 60 may move vertically to indicate the score for each type of land development. We can vary the time required to play by using one, two or three of these columns for scoring thereby establishing a quota for the players to shoot for as their winning score. The time required to play in minutes can be determined by using the following formula:

$Tm$=20×No. of Columns used in Scoring×No. of Players.

Thus by using 2 columns in the scoring screen and with 4 players we establish a quota that will require approximately 160 minutes to accomplish. By first moving the scoring pieces up each column and then back down we can double the quota and extend the time needed to accomplish it.

The player who first reaches his quota of the various types of land development wins the game. In order to win, however, a player must maintain a balanced development in keeping with the proper distribution of land uses. As the player may select possible positions within any one of nine squares during any play, he may control the development pattern, although this may not affect his score. All colors (land uses) must be properly represented in the winning score. Thus vacant land and agricultural land occur more frequently than commercial and recreational; surface transportation occurs more extensively than multi-family residential and community facilities, on the one hand, and industrial and single-family residential, on the other.

FIG. 8 shows an alternative playing screen having hexagonal openings. The screen comprises a number of concentric rings which are identified by numerals arranged along a radius of the screen. Each concentric ring is divided into a number of sectors by lines extending radially from the center of the screen, the ends of which lines are shown in FIG. 8 extending radially outwardly from the outer edge of the screen. For example, the sector 2 in FIG. 8 is that portion of each respective ring lying between the two radial lines on either side of the numeral 2 disposed outside of and along the outer edge of the screen.

The cubes shown in FIG. 9 are adapted to be disposed in the hexagonal openings of the screen of FIG. 8. As shown in FIGS. 10 and 11, the cubes cooperate well with the hexagonal screen openings, permitting the cubes to be built up upon each other to an upper level or upper levels.

An alternative form of input generator is shown in FIGS. 12 and 13. This input generator comprises a container 70 with two compartments 71, 72, each having depressions numbered 1 through 9. Each compartment further contains one ball, which is permitted to move about freely when the input generator is shaken. The balls then each settle into one of the depressions, thereby selecting at random a pair of numbers ranging from 1 to 9.

I claim:

1. A game apparatus comprising a map of a territory, a screen positioned over the map and having formed therein a plurality of openings disposed above the representation of a territory on the map, means associated with said screen displaying coordinate designating numbers, and a plurality of playing pieces adapted to be mounted on the screen in the openings thereof.

2. The structure of claim 1, including input generator means for selecting by chance certain of said coordinate designating numbers to determine the location of said playing pieces on said screen.

3. The structure of claim 2, in which said input generator means comprises a plurality of pairs of dice, each 4. The structure of claim 2, in which said input generator means comprises a plurality of pairs of dise, each die being formed with one blank face, a face opposite said blank face having five spots, another face havin gone spot, a face opposite said face with one spot having four spots, another face having two spots, and a face opposite said face with two spots having three spots.

5. The structure of claim 1, in which said openings in said screen are square and said playing pieces are spherical.

6. The structure of claim 1, in which said openings in said screen are hexagonal and said playing pieces are cubical.

7. The structure of claim 1, in which said playing pieces are of unlike colors.

8. The structure of claim 1, in which said map is composed of playing areas of unlike colors.

9. The structure of claim 1, in which said screen is rigid and has uniform fixed-size openings therein, said openings and said playing pieces being so coordinated in size, and said openings being so relatively positioned, that a plurality of playing pieces in adjacent openings may support playing pieces positioned thereover.

References Cited

UNITED STATES PATENTS

| | | | |
|---|---|---|---|
| 1,797,742 | 3/1931 | Ward | 273—134 |
| 2,249,079 | 7/1941 | Garrett | 273—145 |
| 2,528,792 | 11/1950 | Seaman | 273—131 |
| 2,601,985 | 7/1952 | Yerkes | 273—120 |
| 3,118,675 | 1/1964 | Lyle | 273—146 X |
| 3,180,647 | 4/1965 | Somerville et al. | 273—138 |
| 3,181,867 | 5/1965 | Dreyer | 273—131 |
| 3,212,782 | 10/1965 | Jungels | 273—130 |

FOREIGN PATENTS 156,870    11/1956    Sweden.

DELBERT B. LOWE, Primary Examiner

U.S Cl. X.R.

273—136, 138, 145, 146, 148

UNITED STATES PATENT OFFICE
CERTIFICATE OF CORRECTION

Patent No. 3,484,108                                    December 16, 1969

John H. Geiger

It is certified that error appears in the above identified patent and that said Letters Patent are hereby corrected as shown below:

Column 3, first table, 3rd column, 2nd line, "opposit" should read -- opposite --. Column 5, line 3, after "PLACEMENT" insert -- OF --; line 50, "x" (italicized) should read -- x -- ("times" symbol); line 72, "(Grid Square 5,3)," should read -- (Grid Square 5,5), --. Column 6, line 22, "wite" should read -- white --. Column 7, line 39, insert a period (.) after "dice"; cancel ", each". Column 8, line 1, "dise" should read -- dice --; line 3, "havin gone" should read -- having one --. Column 4, line 25, "6. There" should read -- 6, there --.

Signed and sealed this 4th day of August 1970.

(SEAL)
Attest:

EDWARD M. FLETCHER, JR.                      WILLIAM E. SCHUYLER, JR.
Attesting Officer                                Commissioner of Patents